US007009945B1

(12) United States Patent
Tang et al.

(10) Patent No.: US 7,009,945 B1
(45) Date of Patent: Mar. 7, 2006

(54) DUAL-MODE ANALOG/DIGITAL ADAPTIVE ECHO CANCELLATION IN COMMUNICATION SYSTEMS WITH ASYMMETRIC SPECTRUM

(75) Inventors: Xiangguo Tang, Union City, CA (US); Amir H. Fazlollahi, Pleasanton, CA (US); Guozhu Long, Fremont, CA (US)

(73) Assignee: Centillium Communications, Inc., Fremont, CA (US)

( * ) Notice: Subject to any disclaimer, the term of this patent is extended or adjusted under 35 U.S.C. 154(b) by 16 days.

(21) Appl. No.: 10/836,542

(22) Filed: Apr. 30, 2004

Related U.S. Application Data

(60) Provisional application No. 60/479,782, filed on Jun. 18, 2003, provisional application No. 60/554,709, filed on Mar. 18, 2004.

(51) Int. Cl.
*H04B 3/20* (2006.01)
*H04M 9/08* (2006.01)

(52) U.S. Cl. .................................. 370/286; 379/406.01
(58) Field of Classification Search ................ 370/286, 370/288, 292; 375/219, 220, 221, 222; 379/406.01
See application file for complete search history.

(56) References Cited

U.S. PATENT DOCUMENTS

| | | | | |
|---|---|---|---|---|
| 5,623,513 | A * | 4/1997 | Chow et al. ................. | 375/219 |
| 6,259,680 | B1 * | 7/2001 | Blackwell et al. ........... | 370/286 |
| 6,421,377 | B1 * | 7/2002 | Langberg et al. ............ | 370/286 |
| 6,480,532 | B1 * | 11/2002 | Vareljian ..................... | 375/222 |
| 6,542,477 | B1 * | 4/2003 | Pal et al. ..................... | 370/286 |
| 6,590,976 | B1 * | 7/2003 | Lin ........................... | 379/406.1 |
| 6,618,480 | B1 | 9/2003 | Polley et al. | |
| 6,853,626 | B1 * | 2/2005 | Farhang-Boroujeny et al. ......................... | 370/286 |
| 2003/0206624 | A1 * | 11/2003 | Domer et al. .......... | 379/406.01 |
| 2005/0099966 | A1 * | 5/2005 | Huang et al. ................ | 370/286 |

OTHER PUBLICATIONS

Alper Erdogan et al, "Efficient Implementation of Echo Canceller for Applications With Asymmetric Rates", Acoustics, Speech and Signal Processing, 2003, Proceedings, ICASSP, '03., Apr. 6-10, 2003.
Long, Guozhu et al., The LMS Algorithm with Delayed Coefficient Adaptation, IEEE Transactions on Acoustics, Speech and Signal Processing, vol. 37, No. 9, Sep. 1989.
Erdogan, Alper, et al., Efficient Implementation Of Echo Canceller F or Applications With Asymmetric Rates.

* cited by examiner

*Primary Examiner*—Ricky Ngo
*Assistant Examiner*—Feben Haile
(74) *Attorney, Agent, or Firm*—Fenwick & West LLP

(57) ABSTRACT

An echo cancellation (EC) system for use in a full-duplex communication system having asymmetric signal sampling rates, in particular an ADSL system, is described. The system performs the cancellation of local echo signal in digital or analog domain depending on the loop condition using a switching logic. The EC system further includes an EC unit that generates a digital echo estimate signal at the lower sampling rate of the transmitted signal and then interpolates the digital signal to higher sampling rate to cancel echo signal thereby reducing computation complexity. The digital interpolated echo estimate signal is converted to analog form for use in analog echo cancellation. The subtracted signal resulting from the analog echo cancellation is converted into digital domain and used as feedback for the EC unit to adaptively improve the accuracy of the echo estimate.

18 Claims, 4 Drawing Sheets

DUAL-MODE ANALOG/DIGITAL ADAPTIVE ECHO CANCELLATION IN COMMUNICATION SYSTEMS WITH ASYMMETRIC SPECTRUM

CROSS-REFERENCE TO RELATED APPLICATIONS

This application claims the benefit of the following provisional patent applications, each of which is incorporated by reference in its entirety: U.S. Provisional Application No. 60/479,782, filed Jun. 18, 2003 entitled "Echo Cancellation in Communications Systems with Asymmetric Spectrum," and U.S. Provisional Application No. 60,544,709, filed Mar. 18, 2004 entitled "Echo Cancellation in a Communication System with Multiple Asymmetric Spectrums" having the same inventors.

FIELD OF THE INVENTION

The invention generally relates to echo cancellation in full duplex communication systems, in particular in Asymmetric Digital Subscriber Line (ADSL) Systems.

BACKGROUND

In a full-duplex communication system, one communication device, for example, a modem, is transmitting a signal and receiving a signal at the same time. One result is that an echo signal leaks from the transmission path to the receiving path. An echo canceller (EC) is employed to effectively remove or cancel this echo signal from the received signal.

FIG. 1 illustrates a block diagram of a prior art ADSL communication system including two modems A and B that are connected through a physical media (a twisted pair line, for example). Modem A is the Customer Premises Equipment (CPE) side modem and includes Echo Canceller A which performs echo cancellation in the digital domain. Modem B is the Central Office (CO) side modem. This discussion focuses on CPE modem A although the problems discusses are equally applicable to the CO modem B. The transmitting path shown includes Encoder A for encoding data into symbols which is communicatively coupled to modulator A for modulating the symbols into a time-domain digital transmission signal. Modulator A is also communicatively coupled to Echo Canceller A to which it also forwards the time-domain digital transmission signal as a reference signal. Digital to Analog Converter (DAC) A converts the digital transmission signal to an analog time-domain transmission signal which Line Driver A amplifies and sends to Hybrid A. Hybrid A separates the transmitting (TX) and receiving (RX) paths of modem A. Ideally, Hybrid A blocks the TX signal from echoing back into the receiving (RX) path of modem A. A practical hybrid, however, provides only about 20 dB of attenuation from the TX path to the RX path. The receiving path includes Analog Amplifier A for amplifying a received signal. The received signal includes the far-end signal plus any local echo signal (RX+Echo) which leaked through Hybrid A. Analog to Digital Converter (ADC) A converts the amplified received signal to a digital signal which Demodulator A sends to the Echo Canceller A for removal of the local echo signal. Demodulator A receives the modified received signal from Echo Canceller A from which it demodulates symbols which are then decoded into data by Decoder A. One example of an echo cancellation scheme for an ADSL system has been proposed by Minnie Ho, John M. Cioffi and John A. C. Bingham, "Discrete Multitone Echo Cancellation", IEEE Transactions on Communications, vol. 44, no. 7, pp. 817–825, July 1996, which is hereby incorporated by reference. Utilizing the characteristics of Discrete Multi-tone (DMT) modulation, this digital scheme partially cancels an echo signal in the time domain and cancels the remaining echo signal in the frequency domain.

One problem that can arise is an ADC dynamic range saturation problem wherein the echo signal enters the ADC block before cancellation where it can potentially saturate the ADC and reduce its dynamic range for the desired RX signal. For example, a strong local echo signal entering the ADC with an attenuated far-end received signal significantly reduces the gain available for the desired RX signal from the CO. In a frequency division duplex (FDD) communication system, where the TX and RX bands are separate, this ADC dynamic range saturation problem can be overcome using separation filters. In an overlapped-spectrum system, however, separation filters cannot be used so that an echo canceller (EC) is typically used. The ADC saturation problem in a digital EC has been addressed in the U.S. Pat. No. 6,618,480 by Michael O. Polley and William J. Bright of Texas Instruments. However, the proposed solution is to partially remove the echo in analog and remove the remaining echo in digital and does not provide any method to train its proposed analog/digital ECs.

FIG. 2 illustrates an example of an overlapped and non-overlapped spectrum in a full-duplex communication system, an ADSL system. The upstream (US) signal and the downstream (DS) signal are transmitted within the bands of [f0 Hz, f1 Hz] and [f2 Hz, f3 Hz], respectively. In one example, the FDD system, the downstream spectrum 204 does not overlap the upstream spectrum. In another example, to increase the DS capacity, the DS signal frequency band can be extended to the US band as shown in FIG. 2 so that the downstream spectrum 202 overlaps the upstream spectrum.

When f2<f1, an echo canceller is required at both the CO and CPE sides because DS and US share the band of [max(f1,f2) Hz to f1 Hz]. For illustrative purposes, the discussion focuses on echo cancellation at the CPE side, in which the sampling rate at the receiving (RX) path is X times the sampling rate at the transmission (TX) path, where X is an integer number. In one embodiment, example 1, the signal sampling rate at CPE-RX path is 2208 kHz. The sampling rate at CPE-TX path is 552 kHz. Then X=4 for this embodiment. In another example, example 2, the signal sampling rate at CPE-RX path is 8.832 MHz (corresponding to f3 as high as 3.75 MHz or up to 4.416 MHz) and the sampling rate at CPE-TX path is 1104 KHz (corresponding to f1 as high as 552 KHz). In this case X=8. As illustrated by these examples in the overlapped ADSL system, the transmitted upstream signal sampling rate at the CPE side is significantly lower than that of the received downstream signal sampling rate.

It is desirable to provide an echo cancellation system in which the echo signal is cancelled before analog to digital conversion to avoid dynamic range saturation. It is also desirable to provide an echo cancellation system which can accommodate a system when operating with an overlapped-spectrum and when operating with a non-overlapped spectrum. This is particularly desirable for an ADSL system because in an ADSL system, for example, due to spectral compatibility issues, overlapped-spectrum cannot be used beyond a certain loop length and FDD must be used. It is also desirable that an echo cancellation system eliminates the need for separation filters in an FDD system used for echo suppression. It is also desirable that an echo cancellation system accommodates asymmetric signal sampling rates. It is also desirable that an echo cancellation system can selectively cancel the echo in either the analog domain or the digital domain depending on the applications or modes of operations.

SUMMARY OF INVENTION

The present invention provides various embodiments of a system and a method for echo cancellation in a full-duplex communication system that overcome the limitations of the prior art. In a full-duplex communication system, a system for echo cancellation in accordance with an embodiment of the present invention comprises a digital echo canceller unit for generating a digital echo estimate signal, a digital to analog converter (DAC) communicatively coupled to the digital echo canceller unit for converting the digital echo estimate signal to an analog echo estimate signal, a Low-Pass Filter (LPF) communicatively coupled to the DAC to suppress the out-of-band DAC noise floor, an analog attenuator communicatively coupled to the LPF to further suppress the DAC noise, and an analog subtractor communicatively coupled to the analog attenuator for receiving the analog echo estimate signal. The analog subtractor is also communicatively coupled to a communication interface to receive a received signal superimposed with a local echo signal. The analog subtractor generates an analog error signal by differencing the echo estimate signal and the superimposed received signal. The analog subtractor is communicatively coupled to an analog to digital converter which converts the analog error signal to a digital error signal. The converter is communicatively coupled to the digital echo canceller unit which receives the digital error signal. In another embodiment, the full-duplex communication system uses asymmetric signal sampling rates including a lower one and a higher one, and the digital echo cancellation unit generates the digital echo estimate signal based on the lower one of the signal sampling rates. In yet another embodiment, the system comprises switching logic for selecting a digital echo cancellation path or an analog echo cancellation path based on a criteria.

A method for echo cancellation in a full-duplex communication system comprises generating a digital echo estimate signal based upon a transmitted signal and a digital error signal, converting the digital echo estimate signal to an analog echo estimate signal, differencing the analog echo estimate signal and a received signal superimposed with a local echo signal resulting in an analog error signal, and converting the analog error signal to a digital error signal. In another embodiment, the communication system operates using asymmetric signal sampling rates, including a lower one and a higher one, and generating a digital echo estimate signal based upon a transmitted signal and a digital error signal further comprises generating the digital echo estimate signal based on the lower signal sampling rate. In another embodiment of the method, generating a digital echo estimate signal based upon a transmitted signal and a digital error signal further comprises generating an intermediate echo estimate signal based upon the transmitted signal having a lower signal sampling rate than a signal being received and the digital error signal, and interpolating the intermediate echo estimate signal into the digital echo estimate signal having the same signal sampling rate as the signal being received.

DETAILED DESCRIPTION

Figure 1:
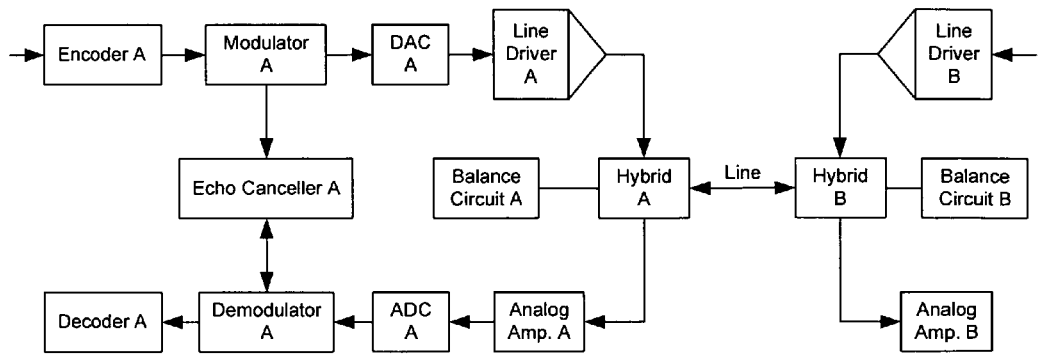
FIG. 1 illustrates a block diagram of a prior art ADSL communication system including two modems A and B.
Figure 3:
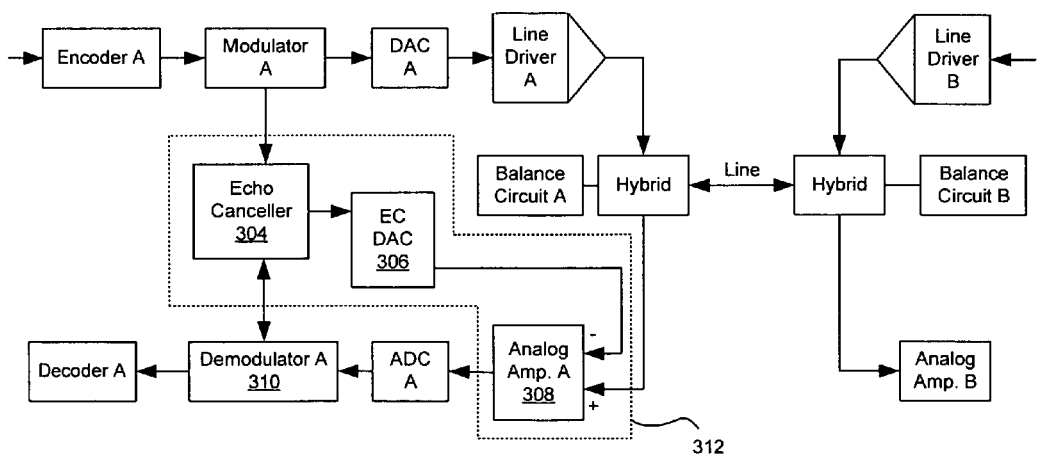
FIG. 3 illustrates a block diagram of an ADSL modem including a system for analog echo cancellation.

FIG. 3 illustrates a block diagram of an ADSL modem including a system for analog echo cancellation in accordance with an embodiment of the present invention. As in FIG. 1, modem A at the CPE side and a portion of the components of modem B at the CO side are illustrated. Modem A in FIG. 3 differs from modem A in FIG. 1 in that FIG. 3 includes a system 312 for analog echo cancellation comprising echo canceller unit 304 that, in one example, is a Finite Impulse Response (FIR) adaptive filter, echo canceller digital to analog converter 306 and an analog substractor 308. Echo canceller unit 304 produces a digital echo estimate signal and is communicatively coupled to echo canceller digital to analog converter (EC DAC) 306 which converts the digital echo estimate signal into an analog estimate signal. EC DAC 306 is communicatively coupled to an analog substractor 308, illustrated in this embodiment as a differential amplifer 308 for subtracting the analog echo estimate signal from a received analog signal including any local echo signal. During training, with no far-end RX signal present, the subtraction results in an error signal that is used to train and adapt the EC coefficients. ADC A receives the error signal and converts it to a digital signal that is received by Demodulator 310. In this embodiment, demodulator 310 sends the digital error signal to the digital echo canceller 304 as an error signal which can be used as feedback for adaptively training the echo canceller coefficients. In data mode, or show-time, the subtraction results in a modified received signal from which the local echo signal has been removed. It is expected that the echo channel impulse response changes over time with temperature, humidity, etc. In this case, the initial trained EC coefficients will not be valid as time progresses in showtime. After the subtraction, the signal is the far-end RX signal plus any error signal between the echo signal and the estimated echo signal. By removing the far-end RX signal, using techniques such as block LMS (please see [0030]), the remaining residual error signal can be used to readjust the EC coefficients.

Echo canceller unit 304 can take form in various embodiments. For example, it can comprise a time-domain echo canceller implemented as a finite impulse response (FIR) filter which filters a version of the transmitted signal upsampled to the signaling rate of the received signal. The echo canceller unit 304 further comprises logic (for example, implemented in hardware, software, firmware or a combination of any of these) for an adaptive echo cancellation algorithm. An example of an adaptive echo cancellation algorithm is one that adaptively updates filter coefficients based on an error signal generated from the differencing between the echo estimate signal and the received signal. Examples of least means square algorithms are discussed below. The echo canceller unit 304 can also be implemented as a time and frequency domain echo canceller (TFEC).

In the system embodiment of FIG. 3, the local echo signal is removed prior to analog to digital conversion so that the dynamic range of ADC A improves and increases the received signal to quantization noise ratio while at the same time can eliminate the use of bulky analog filters when FDD is used.

Figure 4:
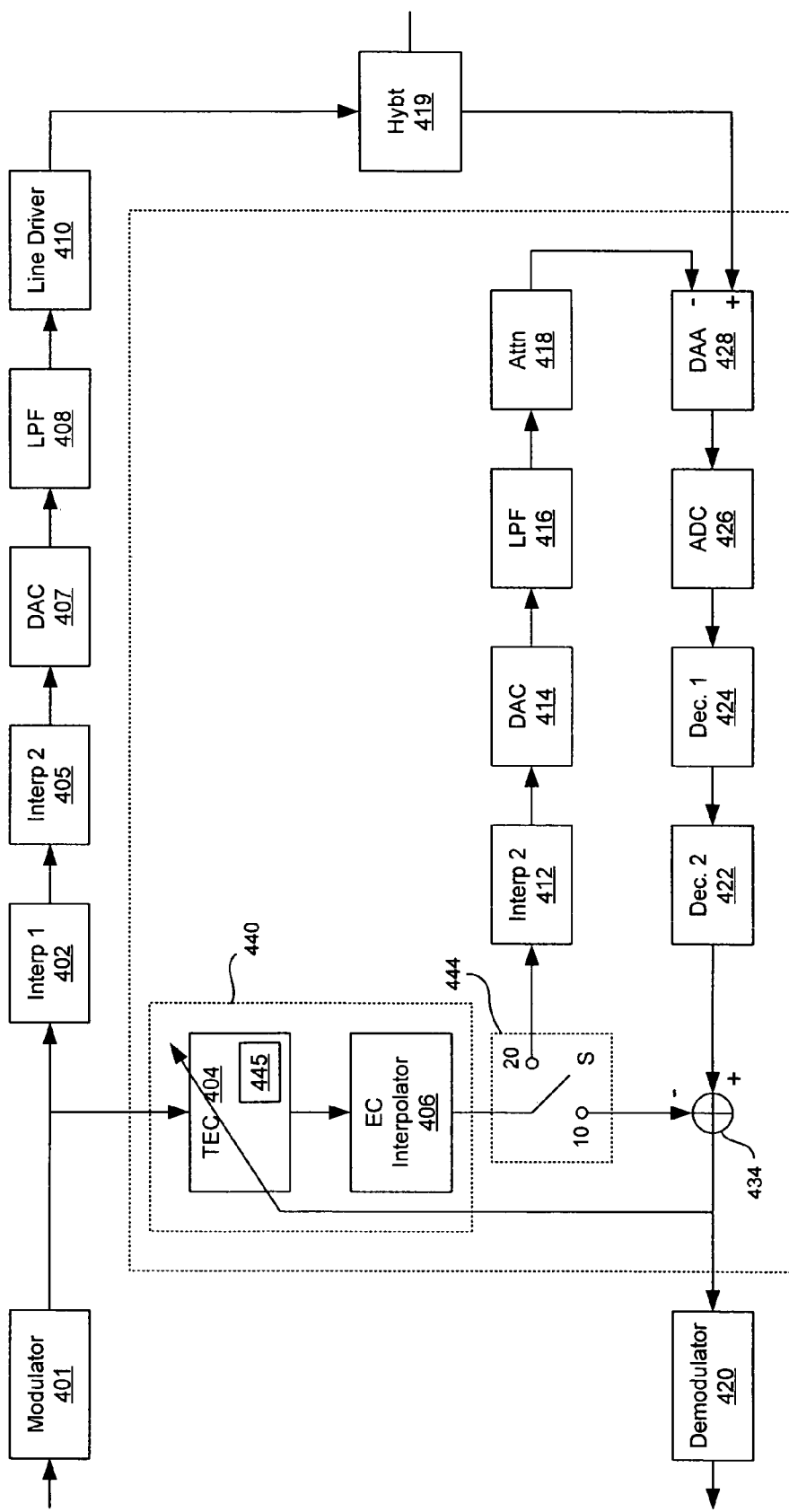
FIG. 4 illustrates a detailed block diagram of an ADSL modem including a system for echo cancellation including an analog echo cancellation path, a digital echo cancellation path, and switching logic for switching between them in accordance with another embodiment of the present invention.

FIG. 4 illustrates a block diagram of system 432 for echo cancellation in an ADSL CPE modem in accordance with another embodiment of the present invention. The CPE modem includes a transmitting path and a receiving path in which elements of the system 432 for echo cancellation operate as discussed below. The transmitting path comprises a modulator 401 for modulating the symbols into a time-domain output transmit signal which is communicatively coupled to both a time-domain echo canceller unit 404 and a first interpolator 401. In one example, where Discrete Multi-tone (DMT) modulation is used, the modulator is an inverse fast Fourier transform (IFFT). The sampling rate at the modulator 401 output is lower than the sampling rate at the demodulator 420 input. The first interpolator 402 and a second interpolator 405 which both in turn interpolate the transmit signal from the modulator 401 to be at the desired signal sampling rate, a DAC 407 which converts the transmit signal to an analog signal which is output to the low pass filter 408 which reduces out-of-band DAC noise and is input to Line Driver 410 and then to Hybrid 419 for output to the transmission line. The receiving path that the received signal from the Hybrid 419 passes through includes a differential amplifier 428 whose output signal is coupled to ADC 426 which converts the received signal to digital form which is then decimated in turn by a first decimator 424 and a second decimator 422 before passing through a digital subtraction unit 432 to demodulator 420. In one example, where DMT modulation is used, the demodulator consists of a time-domain equalizer and an FFT.

Figure 2:
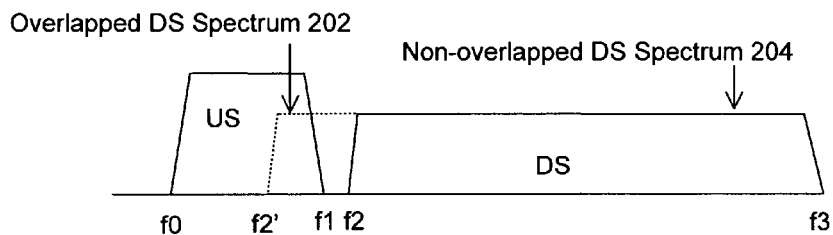
FIG. 2 illustrates as an example of an overlapped spectrum and an example of a non-overlapped spectrum in an ADSL system.

In this embodiment, the system 432 for echo cancellation comprises an echo cancellation unit 440 including a time-domain echo canceller (TEC) unit 404 including adaptive echo cancellation logic 445 and an interpolator 406. In a full-duplex communication system with asymmetric transmitting and receiving spectrums such as those for ADSL or VDSL systems illustrated in FIG. 2, the (TEC) unit 404 estimates an echo signal based on the transmitted signal at the low sampling rate of the CPE-TX path and then interpolates the TEC output to match the high sampling rate of the CPE-RX path. As a result, the computational complexity can be significantly reduced compared with a conventional TEC which first upsamples the transmitted signal to the receiving rate then estimates an echo signal. In one example, where TEC unit 440 includes an FIR filter, the computational complexity for the TEC filter is reduced by a factor equal to the interpolation ratio. The interpolation ratios for the first and second examples of signal sampling rates in FIG. 2 discussed above are 4 and 8, respectively. Even with the extra computation introduced by the interpolation process, the total computational complexity is still significantly lower than for a conventional TEC or TFEC as the number of filter coefficients is less at the lower sampling rate. Embodiments of TEC unit 404 can also be used for the echo cancellation unit 304 in FIG. 3.

Time-domain EC unit 404 outputs an intermediate echo estimate signal to an interpolator 406 which is communicatively coupled to switching logic illustrated here as switch S to which it sends its output. In one example, the EC unit 404 is a finite impulse response (FIR) filter with an equivalent length of the impulse response time-span of the echo path. Switching logic S is communicatively coupled to receive the interpolated digital echo estimate signal and the switch is capable of communicatively coupling to one of a plurality of echo cancellation paths, in this example, an analog echo cancellation path and a digital echo cancellation path. The switch S further comprises selection logic 444 for determining with which path to connect. The analog echo cancellation path comprises another interpolator 412 which can be coupled to switch position 20 for receiving the digital echo estimate signal. The interpolator 412 performs a second stage of interpolation and is communicatively coupled to send its output signal to DAC 414 for conversion to an analog echo estimate signal which low pass filter 416 receives, filters and sends to attenuator 418 which adjusts the signal strength of the analog echo cancellation estimate signal to be closer to that of the local echo signal that leaks through hybrid 419. The attenuator 418 is communicatively coupled to send the analog echo cancellation estimate signal to a negative input of a differential analog amplifier (DAA) 428, an example of an analog subtractor, which also receives at its positive input a received signal including any local echo signal that leaked from the transmission path. The differenced or modified received signal resulting from the DAA 428 is converted by ADC 426 into a digital signal which is subsequently decimated by decimator 424 and decimator 422. From decimator 422, the modified signal is communicatively coupled to a digital subtractor 434. However, as there is no input from the connection path 10 when the analog path connection 20 was selected, the signal is essentially the same and during EC training is used to train the EC coefficients and during data reception is coupled to demodulator 420 for symbol extraction.

Note that in the analog echo cancellation path, the subtracted signal, which can also be referred to as the error signal, has to go through a series of blocks such as ADC and decimators before being used in an echo cancellation adaptive algorithm which introduce extra delay. An example of an algorithm that can be used for adaptive echo cancellation and which accommodates the extra delay is an LMS algorithm called 'Delayed LMS' and its stability has been studied and verified in Long, G.; Ling, F.; Proakis, J. G., "The LMS algorithm with delayed coefficient adaptation", IEEE Transactions on Acoustics, Speech, and Signal Processing, Volume: 37, Issue: 9, Page: 1397–1405, September 1989, which is hereby incorporated by reference.

In another example, responsive to selection criteria, the selection logic 444 of switch S determines that switch position 10 is to be selected so that the digital echo estimate signal is coupled to the digital echo cancellation path. The received signal from hybrid 419 passes through DAA 428 including any leaked local echo signal essentially unchanged as there is no signal on the negative input due to the disconnection at position 20. ADC 426 converts the received signal to a digital signal which is decimated in turn by each of decimator 1 and decimator 2 which sends the decimated received signal to digital subtractor 430 on a positive input. The digital subtractor 434 receives the interpolated digital echo cancellation estimate signal on its negative input. During TEC training with no far-end signal present, the resulting difference signal is forwarded to the time-domain echo canceller unit 404 as feedback for adaptively training the EC FIR coefficients and generating the echo estimate signal. During data mode, the resulting difference signal is sent to demodulator 420.

In one example, the selection criterion is predetermined or user defined. In another example, selection criteria for determining which echo cancellation path connection to select is the loop length between a CPE modem and a CO modem. For a long loop, e.g., 6Kft of 26AWG or longer, the local echo signal may be significantly more powerful than the received far-end signal so that analog echo cancellation provides greater dynamic range to the ADC for converting the desired far-end signal by subtracting the echo before entering the ADC. On short loops, e.g., shorter than 6Kft of 26AW, where the echo signal power is less than the received signal power and the SNR of the received signal is very high the extra DAC noise introduced by analog echo canceller can degrade the received signal SNR and therefore digital echo canceller is preferred. Plus, in an ADSL system, for example, due to spectral compatibility issues, overlapped-spectrum cannot be used beyond certain loop length and FDD must be used. In this case, the system embodiment of FIG. 4 provides the advantage of eliminating the use of bulky analog filters, when FDD is used by suppressing the out-of-band echo energy using analog EC. Note that the DAC used to generate analog EC is identical or similar to the DAC used to transmit TX signal. With recent advances in VLSI technology the cost of adding the extra DAC is minimal.

Figure 5:
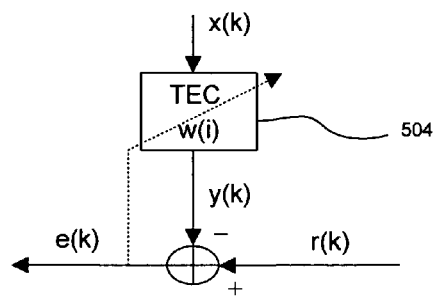
FIG. 5 illustrates a time-domain echo canceller unit and the signals it processes in accordance with a least mean squares algorithm for use in a system for echo cancellation in accordance with an embodiment of the present invention.
Figure 6A:
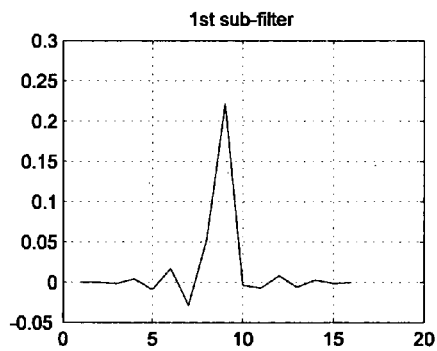
FIGS. 6a, 6b, 6c and 6d each illustrate an impulse response of a respective sub-filter in an implementation example of an interpolator in the digital echo cancellation unit of FIG. 4 for use in a system for echo cancellation in a full duplex communication system in accordance with an embodiment of the present invention.
Figure 6B:
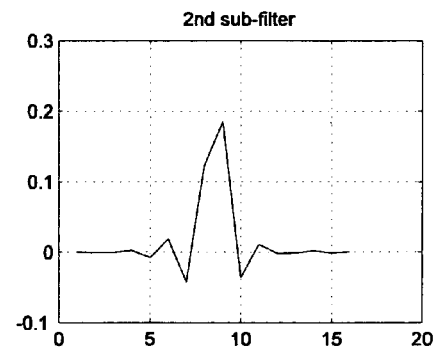
Figure 6C:
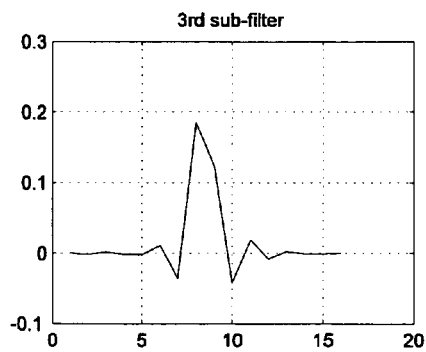
Figure 6D:
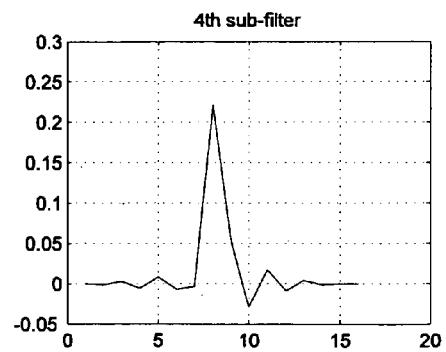

Sample based and block based LMS algorithms are examples of algorithms that the adaptive echo cancellation logic 445 can implement. These examples are first discussed for a TEC system in which the sampling rate for the input signal and the received signal are the same. FIG. 5 illustrates a conventional time-domain echo canceller and the signals it processes in accordance with a least mean squares algorithm for use in a system for analog echo cancellation in accordance with an embodiment of the present invention.

A LMS algorithm updates TEC filter coefficients as follows.

$$y(k) = \sum_{i=0}^{L-1} x(k-i)w(i) \quad (1)$$

$$e(k) = r(k) - y(k) \quad (2)$$

$$w(i) = w(i) + ue(k)x(k-i), i = 0, K\ L-1 \quad (3)$$

w(i) is the filter coefficient, i=0,1, . . . , L−1. L is the length of the TEC filter. x(k) is the input to the filter. y(k) is the output from the filter. r(k) is the received signal. e(k) is the difference between r(k) and y(k). The input signal x(k) and received signal r(k) have the same sampling rate.

In the above procedure, TEC coefficients are updated for each received sample. In SHOWTIME, the normal data transmission state for ADSL modems, (For background information on the operation of ADSL systems, see ITU-T, G.992.1 (G.dmt), July 1999, Editor Final Version entitled "Draft New Recommendation G.992.1: Asymmetrical Digital Subscriber Line (ADSL) Transceivers—Approved," which is hereby incorporated by reference.) it is also desirable that TEC can be adaptive to the echo channel variation. However, since the received signal includes self-echo signal as well as the far-end transmitted signal, the far-end signal would act as strong noise for TEC LMS update, especially on short loops. To mitigate the effect of far-end signal to LMS update, a block LMS algorithm is used to track slow echo channel variation.

The basic idea of block LMS is to update TEC coefficients for each block of received samples instead of each received samples. In block LMS, the first two steps are the same as the sample based LMS, which computes the estimated signal and the residual error. But in the third step, after computing e(k)x(k−i), w(i) is not immediately updated. The update component e(k)x(k−i) is accumulated over a block of received samples, e.g., N samples, and then w(i) is updated with the accumulated e(k)x(k−i). Through accumulation, the far-end signal component is averaged out (as it is independent of the local transmitted signal x(k)) and the echo estimation error component is extracted for LMS update. During this period, w(i) is not changed.

$$y(k) = \sum_{i=0}^{L-1} x(k-i)w(i) \quad (4)$$

$$e(k) = r(k) - y(k) \quad (5)$$

Compute $$v(i) = \sum_{n=0}^{N-1} x(k-i-n)e(k-n), i = 0, 1, \ldots L-1$$

for a block of N samples, When k=tN for t=1,2,3, . . . ,update w(i)=w(i)+uv(i), i=0, 1 . . . ,L−1.

In the embodiments of LMS algorithms, the estimation error used to update the adaptive (FIR) filter coefficients is defined as the difference between the output of filter and the received signal. However, in the TEC unit 440 embodiment, the observable error is the difference between the interpolated TEC filter output and the received signal. In other words, the TEC and the error signal are running at different sampling rates. In the embodiment where the interpolator is composed of sub-filters, the observable error is actually the filtered version of the unobservable estimation error at the TEC filter output. In order to restore the estimation error at the TEC filter output, the observable error can be passed to equalizers (e.g., inverse filters) (not shown) designed for each of the sub-filters of the interpolator.

Adding these equalizers will increase the implementation complexity. Alternatively, if the observable error is treated as a delayed version of the unobservable error, then only the delay needs to be compensated instead of doing inverse filtering. FIGS. 6A, 6B, 6C and 6D show respectively the impulse responses of sub-filter 1, sub-filter 2, sub-filter 3 and sub-filter 4 in one implementation example for the interpolator's 406 in which it is used in an ADSL system operating with the asymmetric spectrum of example 1 in FIG. 2. The length of each sub-filter is 16 taps. As the first sub-filter (FIG. 6A) has the strongest power at its $9^{th}$ tap, the error at its output is used to update the TEC unit 404. On the other hand, the sub-filter delay of 8 should also be compensated. Therefore, when running LMS, e(4k)X(k−8) is computed as the update vector, where X(k)=[x(k), x(k−1), . . . , x(k−L+1)]. e(4k) represents the error at the output of the first sub-filter (FIG. 6A) which introduces minimal distortion to the unobservable error except for a time delay of 8. X(k−8) is used to compensate this delay. This LMS algorithm can be used by the echo cancellation unit 440 embodiment in either the analog or digital echo cancellation paths or when the echo cancellation unit 440 embodiment is used as the echo canceller unit 304 in the system embodiment 312 of FIG. 3. Furthermore, the LMS algorithm can be used in the system embodiment 312 of FIG. 3 when a conventional TEC unit is used. Furthermore, the echo cancellation system embodiment 432 can be modified to use a conventional TEC unit which upsamples the transmit signal prior to receipt by a TEC unit whose output is directed by switch S to either the analog or digital echo cancellation paths.

Figures 7, 8:
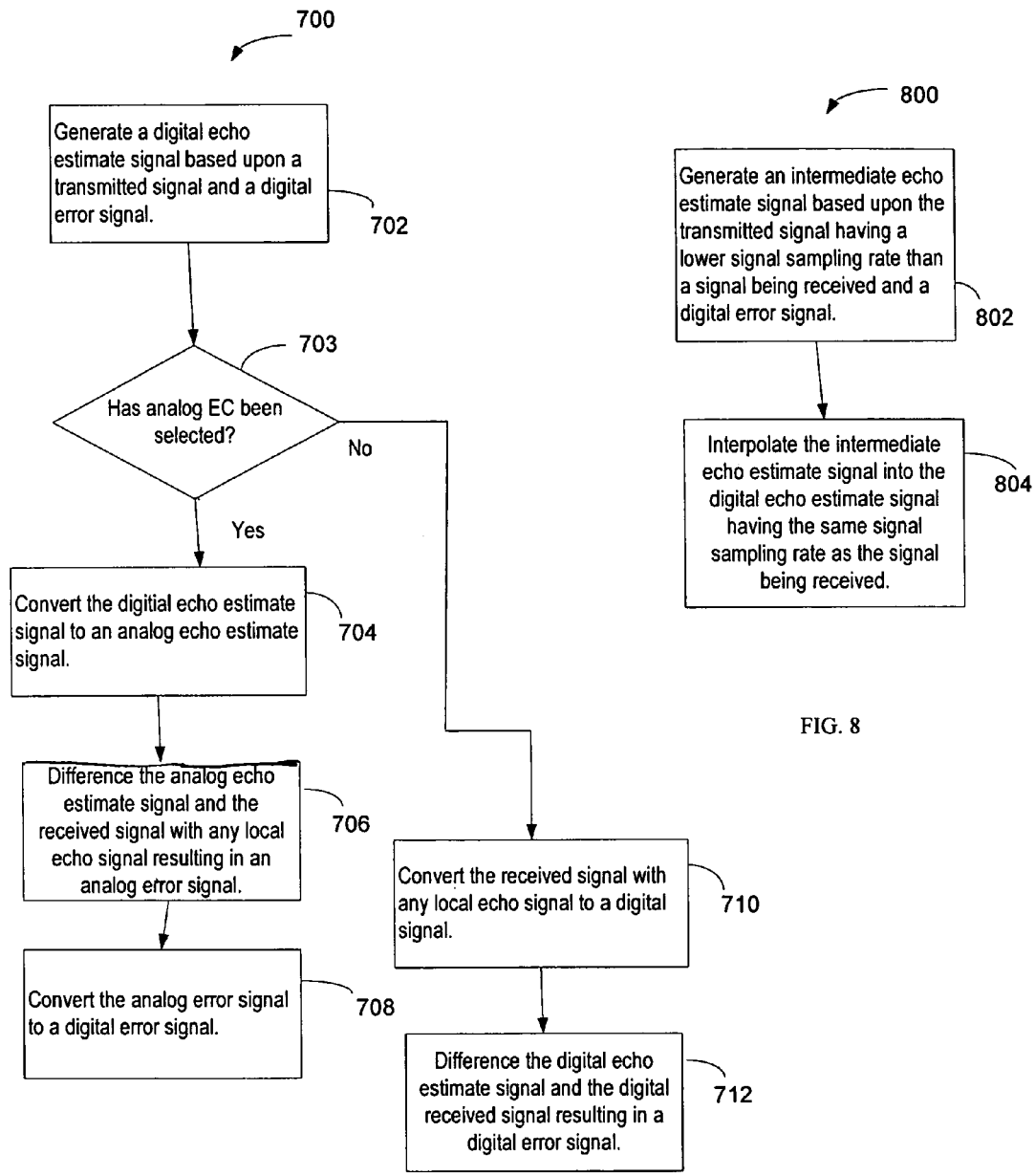
FIG. 7 illustrates a flow chart of a method for selecting between an analog EC path and a digital EC path in a full duplex communication system in accordance with an embodiment of the present invention.
FIG. 8 illustrates a flow chart for generating a digital echo estimate signal based upon a transmitted signal and a digital error signal in a communication system using asymmetric signal sampling rates for transmitting and receiving signals.

FIG. 7 illustrates a flow chart of a method for analog echo cancellation in a full duplex communication system. FIG. 7 is discussed for illustrative purposes in the context of the system of FIG. 4. The echo canceller unit 440 generates 702 a digital echo estimate signal based upon a transmitted signal and a digital error signal. Responsive 703 to criteria indicating selection of analog EC, the DAC 414 converts 704 the digital echo estimate signal to an analog echo estimate signal. The differential analog amplifier 428 differences 706 the echo estimate signal and the received signal superimposed with any local error signal resulting in an analog error signal, and ADC A converts 708 the analog error signal to a digital error signal. Responsive 703 to criteria not indicating selection of analog EC, the ADC 426 converts the received analog superimposed with any local error signal to digital form, and the digital subtractor 434 differences the digital echo estimate signal and the received signal resulting in a digital error signal.

FIG. 8 illustrates a flow chart for generating a digital echo estimate signal based upon a transmitted signal and a digital error signal in a communication system using asymmetric signal sampling rates for transmitting and receiving signals. FIG. 8 is discussed for illustrative purposes in the context of the system of FIG. 4. TEC 404 generates 802 an intermediate echo estimate signal based upon the transmitted signal having a lower signal sampling rate than a signal being received and a digital error signal. Interpolator 406 interpolates 804 the intermediate echo estimate signal into the digital echo estimate having the same signal sampling rate as the signal being received.

One or more of the elements or acts illustrated in the embodiments, although depicted as individual units, any combination of the elements or acts for each embodiment may also be embodied in software, hardware, firmware or any combination thereof and/or be stored in a computer usable medium.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the hereto appended claims.

The invention claimed is:

1. In a full-duplex communication system having a transmit path and a receive path, a system for echo cancellation comprising:
   a digital echo estimator unit for generating a digital echo estimate signal based on the transmit path;
   a switch communicatively coupled to the digital echo estimator unit, the switch configured to select between an analog echo cancellation path and a digital echo cancellation path;
   a digital to analog converter (DAC) communicatively coupled to the analog echo cancellation path of the switch for converting the digital echo estimate signal to an analog echo estimate signal;
   an analog subtractor communicatively coupled to the DAC for receiving the analog echo estimate signal and communicatively coupled to the receive path of the communication system for receiving a received signal superimposed with a local echo signal, wherein the analog subtractor creates an error signal by differencing the analog echo estimate signal and the received signal; and
   a digital subtractor communicatively coupled to the digital echo cancellation path of the switch for receiving the digital echo estimate signal and communicatively coupled to the receive path of the communication system for receiving a received signal superimposed with a local echo signal, wherein the digital subtractor creates an error signal by differencing the digital echo estimate signal and the received signal.

2. The system of claim 1, wherein the full duplex communication system is an Asymmetric Digital Subscriber Line (ADSL) System, and
   responsive to the ADSL system being configured for transmission with an overlapped spectrum with a short loop length, the switch selects the digital echo cancellation path.

3. The system of claim 1, wherein the full duplex communication system is an Asymmetric Digital Subscriber Line (ADSL) System, and
   responsive to the ADSL system being configured for frequency division duplex transmission, the switch selects the analog echo cancellation path.

4. The system of claim 1, wherein the full duplex communication system is an Asymmetric Digital Subscriber Line (ADSL) System, and
   responsive to the ADSL system being configured for transmission with an overlapped spectrum with a long loop length, the switch selects the analog echo cancellation path.

5. The system of claim 1, wherein a sampling rate of the transmit path is lower than a sampling rate of the receive path.

6. The system of claim 5, wherein the digital echo estimator unit comprises:
   an echo estimation filter unit for generating the digital echo estimate signal at the sampling rate of the transmit path; and
   an EC interpolator filter unit communicatively coupled to the echo estimation filter unit, the EC interpolator filter unit for raising the sampling rate of the digital echo estimate signal.

7. The system of claim 6, wherein the echo estimation filter unit generates the digital echo estimate signal based on a set of echo estimation filter coefficients, and the digital echo estimator unit comprises logic for implementing an adaptive training algorithm for adjusting one or more of the filter coefficients.

8. The system of claim 5, further comprising:

a down-sampler for reducing the sampling rate of the error signal to match the sampling rate of the transmit path, the down-sampler coupled to receive the error signal at the sampling rate of the receive path and coupled to provide the down-sampled error signal to the digital echo estimator unit.

9. The system of claim 1, further comprising:

an analog to digital converter communicatively coupled to convert an analog error signal from the analog subtractor to a digital error signal, and further coupled to provide the digital error signal to the digital echo estimator unit.

10. A method for training an echo cancellation system in a full-duplex communication system, the method comprising:

generating a digital echo estimate signal based upon a transmitted signal;

selecting between analog echo cancellation and digital echo cancellation;

responsive to selecting analog echo cancellation:
converting the digital echo estimate signal to an analog echo estimate signal;
differencing the analog echo estimate signal and a received signal superimposed with a local echo signals resulting in an analog error signal; and
converting the analog error signal to a digital error signal; and responsive to selecting digital echo cancellation:
differencing the digital echo estimate signal and a received signal superimposed with a local echo signal, resulting in a digital error signal.

11. The method of claim 10, wherein the full duplex communication system is an Asymmetric Digital Subscriber Line (ADSL) System, the method further comprising:

responsive to the ADSL system being configured for transmission with an overlapped spectrum and having a short loop length, digital echo cancellation is selected.

12. The method of claim 10, wherein the full duplex communication system is an Asymmetric Digital Subscriber Line (ADSL) System, the method further comprising:

responsive to the ADSL system being configured for frequency division duplex transmission, analog echo cancellation is selected.

13. The method of claim 12, wherein generating the digital echo estimate signal comprises:

generating a digital echo estimate signal, the intermediate echo estimate signal based upon the transmitted signal, and interpolating the digital echo estimate signal to raise the sampling rate of the digital echo estimate to the sampling rate of the receive path.

14. The method of claim 10, wherein the full duplex communication system is an Asymmetric Digital Subscriber Line (ADSL) System, the method further comprising:

responsive to the ADSL system being configured for transmission with an overlapped spectrum and having a long loop length, analog echo cancellation is selected.

15. The method of claim 10, wherein the full-duplex communication system has a transmit path and a receive path, and a sampling rate of the transmit path is lower than a sampling rate of the receive path.

16. The method of claim 15, further comprising:

down-sampling the error signal to reduce the sampling rate of the error signal to the sampling rate of the transmit path.

17. The method of claim 16, wherein generating the digital echo estimate signal is performed by an echo estimation filter that uses a set of echo estimation filter coefficients, the method further comprising:

updating one or more of the echo estimation filter coefficients based on an adaptive algorithm.

18. The method of claim 10, wherein the adaptive algorithm used to update the echo estimation filter coefficients is a modified LMS (Least Mean Squared) algorithm that updates the echo estimation filter coefficients using the transmitted signal and the error signal.

* * * * *